(12) United States Patent
Wei

(10) Patent No.: US 10,194,088 B2
(45) Date of Patent: Jan. 29, 2019

(54) PHOTOGRAPHING METHOD AND APPARATUS

(71) Applicant: NUBIA TECHNOLOGY CO., LTD., Shenzhen, Guangdong (CN)

(72) Inventor: Qiang Wei, Shenzhen (CN)

(73) Assignee: Nubia Technology Co., LTD (CN)

( * ) Notice: Subject to any disclaimer, the term of this patent is extended or adjusted under 35 U.S.C. 154(b) by 129 days.

(21) Appl. No.: 15/314,472

(22) PCT Filed: Dec. 16, 2014

(86) PCT No.: PCT/CN2014/093958
§ 371 (c)(1),
(2) Date: Nov. 28, 2016

(87) PCT Pub. No.: WO2015/180452
PCT Pub. Date: Dec. 3, 2015

(65) Prior Publication Data
US 2017/0201695 A1  Jul. 13, 2017

(30) Foreign Application Priority Data

May 29, 2014 (CN) .......................... 2014 1 0233697

(51) Int. Cl.
*H04N 5/232* (2006.01)
*H04N 5/262* (2006.01)
(Continued)

(52) U.S. Cl.
CPC ....... *H04N 5/232933* (2018.08); *H04N 5/232* (2013.01); *H04N 5/2355* (2013.01);
(Continued)

(58) Field of Classification Search
CPC ........... H04N 5/23216; H04N 5/23222; H04N 5/23293; H04N 5/232933; H04N 5/2621; H04N 5/2625; H04N 5/265
See application file for complete search history.

(56) References Cited

U.S. PATENT DOCUMENTS

| 7,110,027 B2 * | 9/2006 | Wyman | H04N 5/772 348/220.1 |
| 2003/0117518 A1 * | 6/2003 | Pyle | H04N 5/2351 348/364 |

(Continued)

FOREIGN PATENT DOCUMENTS

| CA | 2316451 A1 | 2/2002 |
| CN | 2301740 Y | 12/1998 |

(Continued)

OTHER PUBLICATIONS

International Search Report in international application No. PCT/CN2014/093958, dated Feb. 13, 2015.
(Continued)

*Primary Examiner* — Daniel M Pasiewicz
(74) *Attorney, Agent, or Firm* — Eric L. Sophir; Dentons US LLP

(57) ABSTRACT

Disclosed are a photographing method and apparatus. The photographing method includes the steps as follows. Images are continuously acquired during photographing, a currently acquired image is synthesized with a current basic image into a synthesized image, and the synthesized image is taken as a basic image in next synthesis. Synthesized images during photographing are cached. A synthesized image is extracted, according to an operation instruction from a user, from the cached synthesized images to serve as a current basic image, so as to return a photographing progress to a photographing state displayed by the extracted synthesized image. Thus, a certain part of the photographed content is erased or deleted equivalently, light-painted images can be modified in real time, a user may complete one light-painting action with multiple pauses accordingly, a more perfect and complex effect is achieved, the light-painting creation effect is improved, and the user experience is improved.

20 Claims, 4 Drawing Sheets

(51) Int. Cl.
  *H04N 5/265* (2006.01)
  *H04N 5/235* (2006.01)

(52) U.S. Cl.
  CPC ..... *H04N 5/23216* (2013.01); *H04N 5/23222* (2013.01); *H04N 5/23293* (2013.01); *H04N 5/265* (2013.01); *H04N 5/2621* (2013.01); *H04N 5/2625* (2013.01)

(56) References Cited

U.S. PATENT DOCUMENTS

| | | | |
|---|---|---|---|
| 2014/0055638 A1* | 2/2014 | Son | H04N 5/2353 348/229.1 |
| 2014/0168069 A1* | 6/2014 | Chen | G06F 3/03542 345/156 |
| 2015/0042832 A1* | 2/2015 | Warnberg | H04N 5/2621 348/218.1 |
| 2017/0085808 A1* | 3/2017 | Jiang | H04N 5/2621 |

FOREIGN PATENT DOCUMENTS

| | | |
|---|---|---|
| CN | 1819625 A | 8/2006 |
| CN | 102006413 A | 4/2011 |
| CN | 103634530 A | 3/2014 |
| CN | 103797780 A | 5/2014 |
| CN | 103888683 A | 6/2014 |
| CN | 103973984 A | 8/2014 |
| JP | 2011151577 A | 8/2011 |

OTHER PUBLICATIONS

English Translation of the Written Opinion of the International Search Authority in international application No. PCT/CN2014/093958, dated Feb. 13, 2015.

Supplementary European Search Report in European Application No. 14893292.4, dated Dec. 4, 2017, 8 pages.

* cited by examiner

PHOTOGRAPHING METHOD AND APPARATUS

CROSS-REFERENCE TO RELATED APPLICATIONS

This application claims priority to PCT/ CN2014/093958, filed Dec. 16, 2014, which claims priority to Chinese Patent Application No. 201410233697.7, filed May 29, 2014, all of which are incorporated by reference in their entirety.

TECHNICAL FIELD

The disclosure relates to photography and in particular to a photographing method and apparatus.

BACKGROUND

As the photography develops rapidly, light-painting photographing is incorporated into a conventional photographing apparatus. A user may create light-painting works by means of the light-painting photographing to take a picture having an artistic effect. During light-painting, the photographing apparatus continuously acquires images, superposes a currently acquired image and a previous image to synthesize a new image, and the new synthesized image serves as a basic image in next synthesis. In turn, all of bright spots painted by a light-painting pen are recorded finally to form light-painted works.

However, light-painting photographing is controlled only at the beginning and at the end in the conventional art. A photographing process cannot be paused and instead one light-painting action must be completed without stopping. A light-painted image cannot be modified in real time in photographing. If a user is not satisfied with a certain part of the light-painted image, the user has to re-paint an image from the beginning. As such, a light-painting effect is not good and creation efficiency is low.

SUMMARY

The disclosure is mainly intended to provide a photographing method and apparatus, which aims at modifying a light-painted image during photographing and improving a light-painting photographing effect.

To this end, the disclosure provides a photographing method including the steps as follows.

Images are continuously acquired during photographing, a currently acquired image is synthesized with a current basic image into a synthesized image, and the synthesized image is taken as a basic image in next synthesis.

When it is detected that the brightness of the currently acquired image is smaller than a threshold, a currently synthesized image is cached.

A synthesized image is extracted, according to an operation instruction from a user, from the cached synthesized images to serve as a current basic image, so as to return a photographing progress to a photographing state displayed by the extracted synthesized image.

The disclosure provides a photographing method including the steps as follows.

The disclosure also provides a photographing method including the steps as follows.

Images are continuously acquired during photographing, a currently acquired image is synthesized with a current basic image into a synthesized image, and the synthesized image is taken as a basic image in next synthesis.

Synthesized images during photographing are cached.

A synthesized image is extracted, according to an operation instruction from a user, from the cached synthesized images to serve as a current basic image, so as to return a photographing progress to a photographing state displayed by the extracted synthesized image.

Preferably, the step that the synthesized images during photographing are cached may include the steps as follows.

All of the synthesized images during photographing are continuously cached; or, a currently synthesized image is cached at a preset time interval during photographing.

Preferably, the step that the synthesized images during photographing are cached may include: when it is detected that the brightness of the currently acquired image is smaller than a threshold during photographing, the currently synthesized image is cached.

Preferably, the threshold may be a preset proportion of maximum brightness represented by an image format.

Preferably, before the synthesized image is extracted from the cached synthesized images to serve as the current basic image, the method may further include pausing photographing.

Preferably, the method may further include: a picture is loaded as the current basic image.

Preferably, before the currently acquired image is synthesized with the current basic image into the synthesized image, the method may further include: an initial basic image is determined.

Preferably, the step that the initial basic image is determined may include: a picture is loaded as the initial basic image, or a first acquired image is taken as the initial basic image.

Preferably, the method may further include: after the photographing is ended, a currently displayed synthesized image is stored, and all of the cached synthesized images are deleted.

Preferably, the operation instruction may include a swipe operation, executed by the user, on a screen or an operation, executed by the user, on a virtual button or a progress bar displayed on the screen.

The disclosure provides a photographing apparatus including an image acquisition module, an image processing module, a display module and a caching module.

The image acquisition module is configured to continuously acquire images.

The image processing module is configured to: synthesize a currently acquired image with a current basic image into a synthesized image, and take the synthesized image as a basic image in next synthesis; cache synthesized images during photographing to the caching module; and extract, according to an operation instruction from a user, a synthesized image from the caching module to serve as a current basic image, so as to return a photographing progress to a photographing state displayed by the extracted synthesized image.

The display module is configured to display the synthesized image in real time.

Preferably, the image processing module may be configured to: continuously cache all of images synthesized during photographing to the caching module; or, cache a currently synthesized image to the caching module at a preset time interval during photographing.

Preferably, the image processing module may be configured to: cache, when it is detected that the brightness of the currently acquired image is smaller than a threshold during photographing, the currently synthesized image to the caching module once.

Preferably, the threshold may be a preset proportion of maximum brightness represented by an image format.

Preferably, the apparatus may further include a control module, configured to control starting, pausing and ending of the photographing.

Preferably, the image processing module may be further configured to: load a picture as the current basic image.

Preferably, the image processing module may be further configured to: determine an initial basic image.

Preferably, the image processing module may be configured to: load a picture as the initial basic image, or take a first acquired image as the initial basic image.

Preferably, the apparatus may further include a storage module. The storage module may be configured to: take, when the photographing is ended, a currently displayed synthesized image as a final photographed image for storing.

Preferably, the image processing module may be further configured to: delete, when the photographing is ended, all of the synthesized images cached in the caching module.

Preferably, the operation instruction may include a swipe operation, executed by the user, on a screen or an operation, executed by the user, on a virtual button or a progress bar displayed on the screen.

The disclosure provides a photographing method. Some or all of synthesized images generated during photographing are cached. When a user executes a return operation, a corresponding synthesized image is extracted for displaying in real time from the cached synthesized images according to an operation instruction from the user, and serves as a basic image in next synthesis. The method according to the disclosure is equivalent to erasing or deleting a certain part of the photographed contents, thereby achieving modification for light-painted images in real time and allowing the user to complete one light-painting action with multiple pauses accordingly. Therefore, a more perfect and complex effect is achieved, the light-painting creation effect and creation efficiency are improved, and the user experience is improved.

The objective fulfilment, functional features and advantages of the disclosure will be further illustrated with reference to the drawings in conjunction with embodiments.

DETAILED DESCRIPTION

It will be understood that specific embodiments described herein are only intended to explain the disclosure and are not intended to limit the disclosure.

A photographing method (image processing method) according to the disclosure is mainly applied to light-painting photographing. A user performs light-painting creation by means of light-painting photographing, erases or deletes a part of the photographed content in real time in a light-painting creation process so as to return to a previous photographing state, thereby achieving modification for created works in real time.

Figure 1:
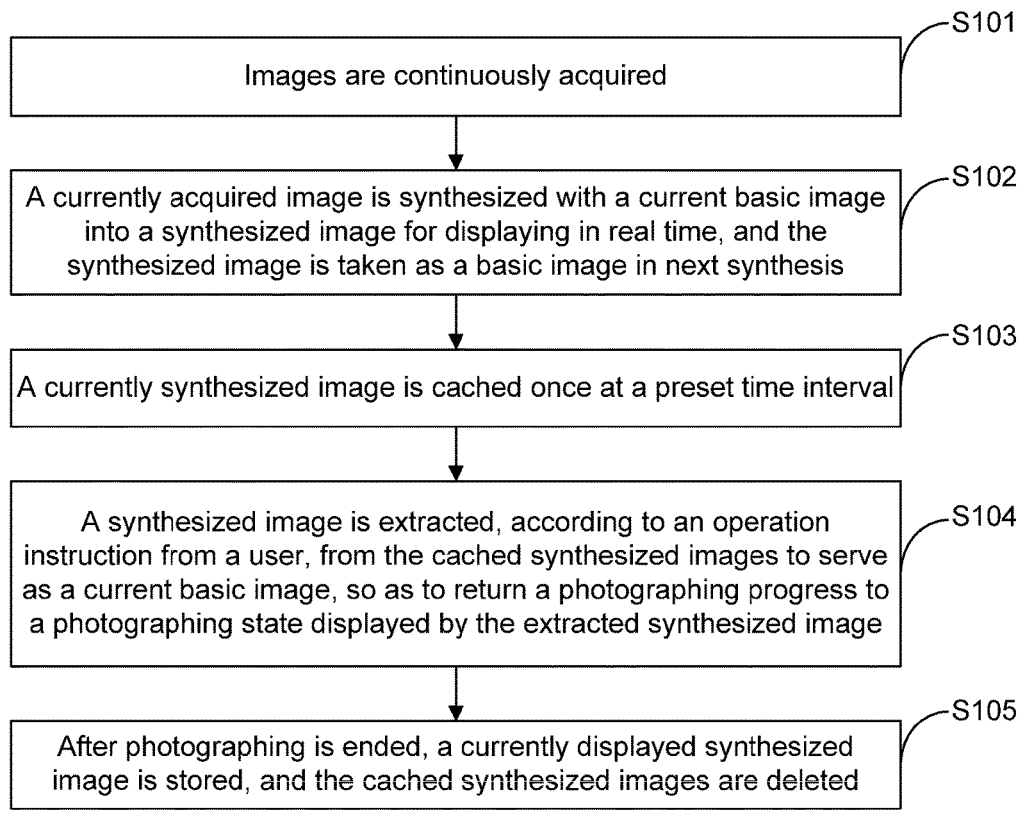
FIG. 1 is a flowchart showing a first embodiment of a photographing method according to the disclosure.

Referring to FIG. 1, a first embodiment of a photographing method according to the disclosure is provided. The photographing method includes the steps as follows.

Step S101: Images are continuously acquired.

After a user clicks on or presses down a photographing button, a photographing apparatus starts to perform light-painting photographing, and continuously acquires images via a camera.

Step S102: A currently acquired image is synthesized with a current basic image into a synthesized image for displaying in real time, and the synthesized image is taken as a basic image in next synthesis.

The photographing apparatus continuously reads the acquired images, synthesizes the images in real time, and displays the synthesized images in real time. In order to synthesize a first synthesized image, an initial basic image needs to be determined. A mobile terminal may load a picture as the initial basic image and may take a first acquired image as the initial basic image.

Usually, when the first image is generated instantaneously at the beginning of photographing, there is no basic image to be synthesized with the currently acquired image. When a second image is to be generated, the first image is taken as the initial basic image, and is synthesized with the currently acquired image to generate the second image. In turn, the $(N-1)^{th}$ image, serving as the basic image, is synthesized with the currently acquired image into an $N^{th}$ image. Meanwhile, each of the synthesized images is displayed on a screen in real time, and the user may check his/her creation effect in real time.

Preferably, before photographing or during photographing, the user may load a picture as a basic image anytime so as to synthesize the images. For example, before the photographing is started, the user loads a background-containing picture, from a local memory, as an initial basic image. After the photographing is started, the photographing apparatus synthesizes the currently acquired image and the current basic image (the initial basic image, namely the loaded picture) into a first synthesized image, and the first synthesized image is taken as a basic image for synthesizing a second synthesized image and is displayed in real time. Thus, light-painting creation will be performed on a more colourful background, and richer light-painted pictures may be created.

Step S103: A currently synthesized image is cached once at a preset time interval.

For example, the photographing apparatus may cache the currently synthesized image once at an interval of 5S. When light-painting lasts for 31S, the photographing apparatus caches six synthesized images, namely images synthesized at 5S, 10S, 15S, 20S, 25S and 30S, respectively.

Step S104: A synthesized image is extracted, according to an operation instruction from a user, from the cached synthesized images to serve as a current basic image, so as to return a photographing progress to a photographing state displayed by the extracted synthesized image.

During photographing, the user may execute a return (or called as erasing or undoing) operation. Specifically, the user may directly swipe on the screen leftwards and rightwards to send an operation instruction. For example, if the user swipes on the screen leftwards once, the photographing apparatus returns to a previous progress, namely returns to a previously cached synthesized image, and extracts the synthesized image to serve as the current basic image for displaying in real time. If the user is not satisfied with the current basic image, the user may further swipe leftwards to return to an earlier progress, and may swipe rightwards to restore to the previously returned progress. The steps are repeated until the user is satisfied. Alternatively, the photographing apparatus may determine a returned progress length according to the length of swiping on the screen by the user.

Figure 2:
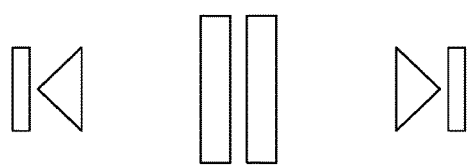
FIG. 2 is a diagram illustrating a photographing interface according to the disclosure.

The photographing apparatus may display virtual forward and backward buttons shown in FIG. 2. The backward button is located on the left side in FIG. 2, and the forward button is located on the right side in FIG. 2. The user sends the operation instruction by clicking on the forward or backward button. If the user clicks on the backward button once, the photographing apparatus returns to a previous progress. If the user clicks on the forward button once, the photographing apparatus restores to the previously return progress.

For example, the synthesized images are cached by the photographing apparatus once at an interval of 5S. When photographing lasts for 22S, the user sends the operation instruction to return once, the photographing apparatus extracts the synthesized image cached at 20S and displays the synthesized image in real time. The photographing progress equivalently returns to a photographing state at 20S, and light-painted contents between 20S and 22S are deleted. When the user continuously sends, a photographing state is returned at 15S, and light-painted contents between 15S and 22S are deleted. After returning operation is ended, the user continues to perform light-painting photographing, and the photographing apparatus performs next image synthesis by taking the synthesized image at 15S as the basic image.

Preferably, when the user executes the return operation, the photographing process is paused. The photographing apparatus may automatically pause photographing when it is detected that the user touches or clicks on the screen during photographing. When the user double-clicks on the screen or no longer touches the screen within a certain time, the photographing apparatus automatically starts to continue photographing. Alternatively, the photographing apparatus pauses photographing or continues photographing by clicking on a pause/photographing button in the middle of FIG. 2 by the user.

Step S105: After the photographing is ended, a currently displayed synthesized image is stored, and the cached synthesized images are deleted.

When the user ends photographing, the photographing apparatus stores a synthesized image currently displayed on the screen as a final photographed image, and deletes all of the cached synthesized images so as to provide a caching space for next photographing. The currently displayed synthesized image may be the currently synthesized image, or may be a certain synthesized image extracted from the synthesized images (that is, after executing the return operation, the user ends photographing).

Thus, since synthesized images generated during photographing are cached, when a user executes a return operation, a corresponding synthesized image is extracted for displaying in real time from the cached synthesized images according to an operation instruction from the user, and serves as a basic image in next synthesis, which is equivalent to erasing or deleting a certain part of the photographed contents, thereby achieving modification for light-painted images in real time, and allowing the user complete one light-painting action with multiple pauses accordingly.

Therefore, a more perfect and complex effect is achieved, and the light-painting creation effect and creation efficiency are improved.

Figure 3:
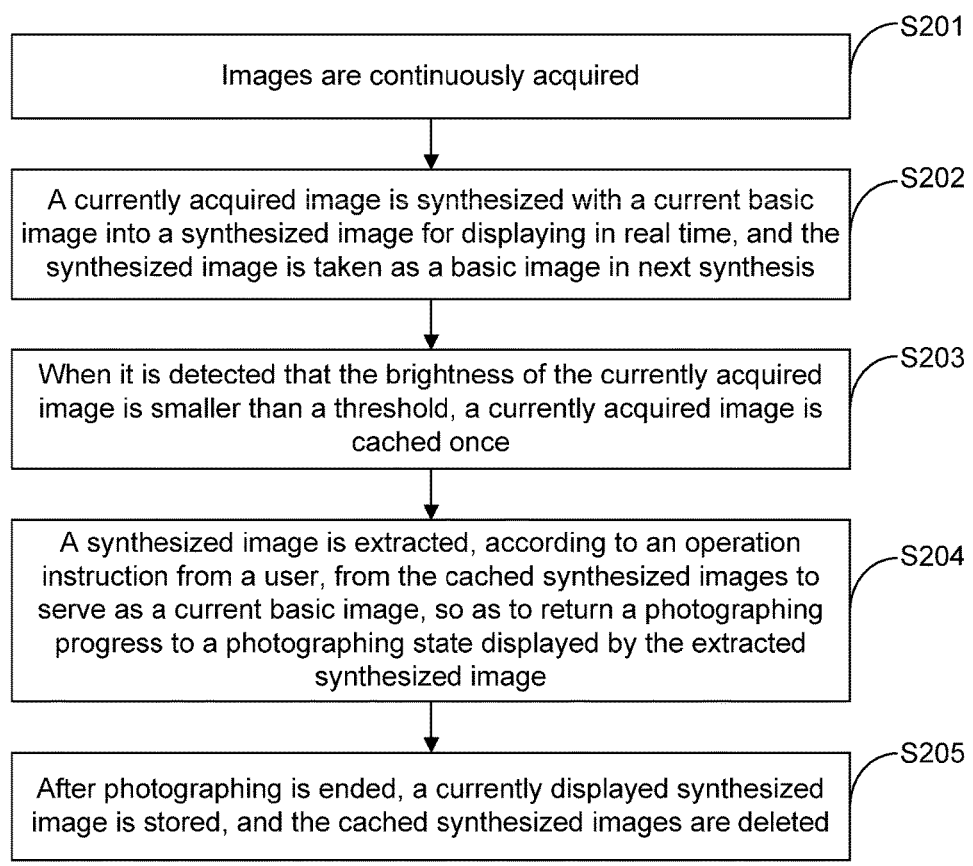
FIG. 3 is a flowchart showing a second embodiment of a photographing method according to the disclosure.

Referring to FIG. 3, a second embodiment of a photographing method according to the disclosure is provided. The photographing method includes the steps as follows.

Step S201: Images are continuously acquired.

Step S202: A currently acquired image is synthesized with a current basic image into a synthesized image for displaying in real time, and the synthesized image is taken as a basic image in next synthesis.

Step S203: When it is detected that the brightness of the currently acquired image is smaller than a threshold, a currently synthesized image is cached once.

When performing light-painting creation, a user will paint stroke by stroke just like traditional painting. Every time the user paints by a stroke, a synthesized image is cached once according to this embodiment, so that compared with a previous synthesized image, a current synthesized image is added with the content of one light-painted stroke.

In specific implementation, in consideration of light-painting photographing under a dark background, a light-painting 'pen' is a bright light beam, the brightness thereof actually being higher than that of a background image. In a light-painting process, if painting is being performed, some blocky areas in the acquired image are bright in this case, and otherwise, all areas are nearly black. When the brightness of the acquired image is relatively low (indicating that a stroke of painting is ended or there is no painting), that is, the brightness is smaller than a threshold, caching is performed once. As such, every time the user returns to a previous step, the content of one light-painted stroke will be correspondingly deleted. The light-painting pen may be any luminous object.

Since brightness and blackness show a striking contrast during light-painting, the threshold may be set as a maximum brightness value or a certain proportion of maximum brightness represented by an image format, such as 10%. The maximum brightness is an upper limit value of any colour value represented by the image format. For example, a range of usual colour expression is 0-255. If the photographing apparatus detects that the brightness of any area (for example, a 3×3 pixel block) in the currently acquired image exceeds the threshold, it is regarded that light-painting is being performed. Otherwise, it is regarded that there is no painting currently and it is within the interval between strokes. Thus, a currently synthesized image is cached.

Step S204: A synthesized image is extracted, according to an operation instruction from a user, from the cached synthesized images to serve as a current basic image, so as to return a photographing progress to a photographing state displayed by the extracted synthesized image.

A return operation implementation according to this embodiment is the same as that in the first embodiment. But every time returning is performed once in this embodiment, the content of one light-painted stroke is deleted, and every time the forward operation is executed once, the content of a stroke deleted recently is restored.

Step S205: After the photographing is ended, a currently displayed synthesized image is stored, and the cached synthesized images are deleted.

Thus, every time a stroke is painted, a synthesized image is cached once according to this embodiment. When the user executes a return operation, the content of one light-painted stroke may be deleted, thereby facilitating stroke-by-stroke modification by the user.

Figure 4:
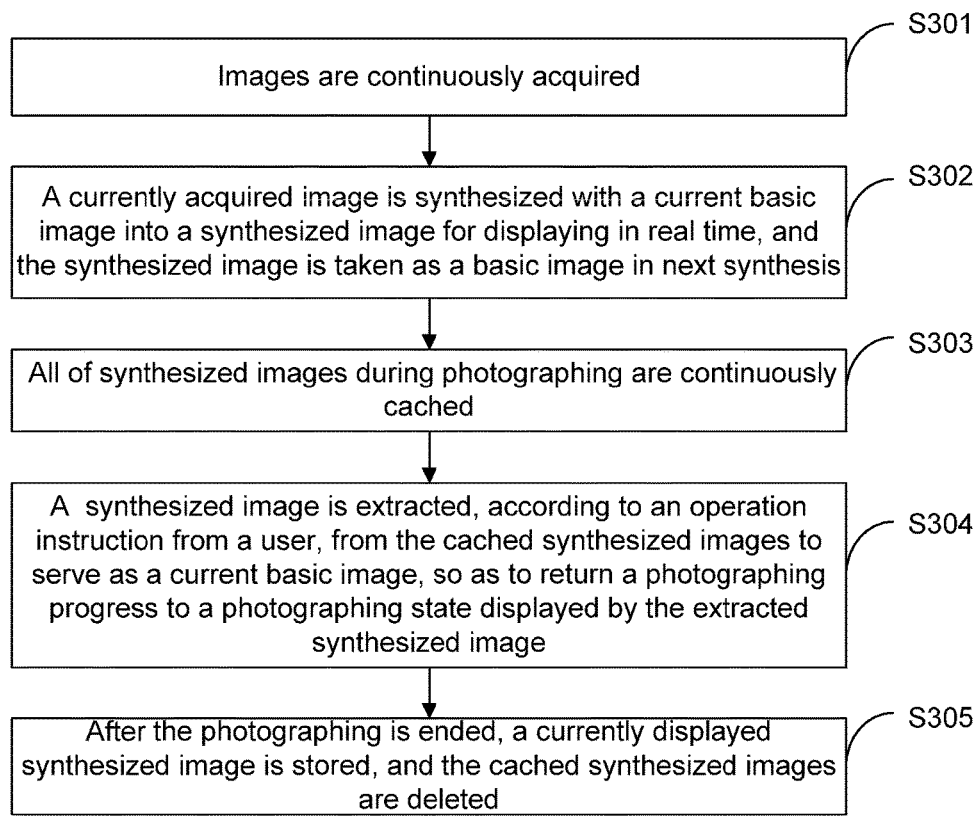
FIG. 4 is a flowchart showing a third embodiment of a photographing method according to the disclosure.

Referring to FIG. 4, a third embodiment of a photographing method according to the disclosure is provided. The photographing method includes the steps as follows.

Step S301: Images are continuously acquired.

Step S302: A currently acquired image is synthesized with a current basic image into a synthesized image for displaying in real time, and the synthesized image is taken as a basic image in next synthesis.

Step S303: All synthesized images during photographing are continuously cached.

In this embodiment, all of the synthesized images during photographing are cached. Due to larger amount of cached data, a storage space of a photographing apparatus is highly required, and a photographing duration is limited by the storage space.

Step S304: A synthesized image is extracted, according to an operation instruction from a user, from the cached synthesized images to serve as a current basic image, so as to return a photographing progress to a photographing state displayed by the extracted synthesized image.

Since all of the synthesized images are cached according to this embodiment, finest returning may be achieved during a returning operation.

Figure 5:
FIG. 5 is another diagram illustrating a photographing interface according to the disclosure.

The returning operation may be executed in the way of the first embodiment. The returning operation may be executed by dragging a progress bar just as adjusting a video playing progress as shown in FIG. 5. In this case, the photographing apparatus correspondingly selects a cached synthesized image according to the indication of the progress bar.

Step S305: After the photographing is ended, a currently displayed synthesized image is stored, and the cached synthesized images are deleted.

Thus, this embodiment allows the user to return to any previous photographing progress, and may achieve finer modification, thereby improving the creation effect.

In some embodiments, if the storage space of the photographing apparatus is larger, after the photographing is ended, the cached synthesized images are not automatically deleted. The user decides to store some or all of the synthesized images or delete all of the synthesized images.

Figure 6:
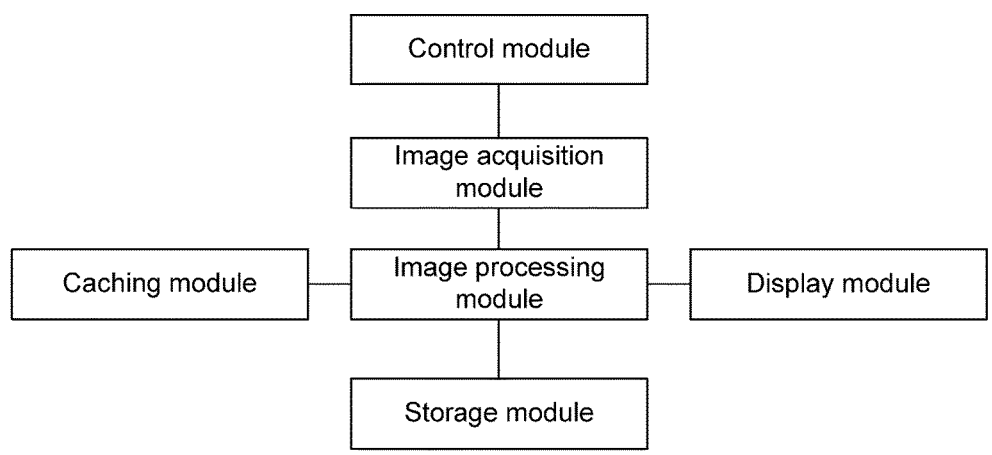
FIG. 6 is a structural diagram illustrating an embodiment of a photographing apparatus according to the disclosure.

Referring to FIG. 6, an embodiment of a photographing apparatus (image processing apparatus) according to the disclosure is provided. The photographing apparatus includes a control module, an image acquisition module, an image processing module, a caching module, a storage module and a display module. The image processing module is connected to the image acquisition module, the caching module, the storage module and the display module, respectively, and the control module is connected to the image acquisition module.

The control module is configured to control starting, pausing and ending of photographing. Specifically, the control module starts, pauses and ends image acquisition by controlling the image acquisition module so as to control the whole photographing process. When the control module controls the image acquisition module to pause image acquisition, the image processing module automatically stops image synthesis.

The image acquisition module is configured to continuously acquire images via a camera during photographing.

The image processing module is configured to: synthesize a currently acquired image with a current basic image into a synthesized image, and take the synthesized image as a basic image in next synthesis; cache synthesized images during photographing to the caching module; and execute a return operation according to an operation instruction from a user, and extract a synthesized image from the caching module to serve as a current basic image, so as to return a photographing progress to a photographing state displayed by the extracted synthesized image; and store, after the photographing is ended, a synthesized image currently displayed on a screen in the storage module.

When a first synthesized image is to be synthesized, the image processing module needs to determine an initial basic image, and the image processing module may load a picture as the initial basic image and may take a first acquired image as the initial basic image.

Specifically, the image processing module reads the acquired images from the image acquisition module in real time or at fixed time, synthesizes the images in real time, sends a synthesized image to the display module for displaying in real time, and takes the synthesized image as a basic image in next synthesis. Usually, when the first image is generated instantaneously at the beginning of photographing, there is no basic image to be synthesized with the currently acquired image. When a second image is to be generated, the image processing module takes the first image as the initial basic image, and synthesizes the first image and the currently acquired image to generate the second image. In turn, the $(N-1)^{th}$ image, serving as the basic image, is synthesized with the currently acquired image into the $N^{th}$ image. Meanwhile, each synthesized image is displayed on the screen in real time, and the user will check his/her creation effect in real time.

Preferably, before photographing or during photographing, the image processing module may load any picture as a basic image anytime according to the operations from the user so as to synthesize the images. For example, before photographing is started, the image processing module loads a background-containing picture, from a local memory, as an initial basic image. After photographing is started, the currently acquired image and the current basic image (the initial basic image, namely the loaded picture) are synthesized into a first synthesized image, and the first synthesized image is taken as a basic image for synthesizing a second synthesized image and is displayed in real time. Thus, light-painting creation will be painted on a more colourful background, and richer light-painted pictures may be created.

When the image processing module caches the synthesized images during photographing, a currently synthesized image may be cached to the caching module once at a preset time interval. During a return operation, the content of light-painting within at least preset time is undone each time. The specific operation refers to the first embodiment of the above photographing method, which will not be elaborated herein.

When it is detected that the brightness of the currently acquired image is smaller than a threshold, the image processing module may cache the currently synthesized image to the caching module once. That is, every time a stroke is painted, caching is performed once. During the return operation, the content of a light-painted stroke is undone each time. The specific operation refers to the second embodiment of the above photographing method, which will not be elaborated herein.

The image processing module may continuously cache all synthesized images during photographing to the caching module. During the return operation, the image processing module may return to any previous photographing progress, thereby achieving finest returning. The specific operation refers to the third embodiment of the above photographing method, which will not be elaborated herein.

Preferably, when the image processing module executes the return operation, the control module controls the photographing process to be paused. The control module may automatically pause photographing when it is detected that the user touches or clicks on the screen during photographing. When the user doubly clicks on the screen or no longer touches the screen within a certain time, the control module automatically starts to continue photographing. Alternatively, the control module pauses photographing or continues photographing by clicking on a pause/photographing button in the middle in FIG. 2 by the user.

The display module is configured to display the synthesized images generated by the image processing module in real time.

The storage module is configured to store, when photographing is ended, a synthesized image currently displayed on the screen as a final photographed image, wherein the currently displayed synthesized image may be the currently synthesized image, or may be a certain synthesized image extracted from the synthesized images (that is, after executing the return operation, the user ends photographing).

When photographing is ended, the image processing module may delete all of the synthesized images in the caching module so as to provide a caching space for next photographing. The image processing module may not automatically delete cached synthesized pictures, and instead the user decides to store some or all of the synthesized images or delete all of the synthesized pictures.

In some embodiments, when the return operation is executed, the photographing process may be continued without pausing.

Accordingly, in the photographing apparatus according to the disclosure, some or all of synthesized images generated during photographing are cached. When a user executes a return operation, a corresponding synthesized image is extracted from the cached synthesized images according to an operation instruction from the user, is displayed in real time, and serves as a basic image in next synthesis, which is equivalent to erasing or deleting a certain part of the photographed contents, thereby achieving modification for light-painted images in real time and allowing the user to complete one light-painting action with multiple pauses accordingly. Therefore, a more perfect and complex effect is achieved, the light-painting creation effect and creation efficiency are improved, and the user experience is improved.

It is noted that light-painting photographing by the photographing apparatus provided by the above embodiments is only illustrated with the above-divided functional modules. In practical application, the functions may be allocated by different functional modules as needed. That is, the internal structure of the photographing apparatus is divided into different functional modules so as to complete all or some of the functions described above. In addition, the photographing apparatus provided by the above embodiments involves the same concept as the embodiments of the photographing method, and thus a specific implementation process thereof may refer to the method embodiments, which will not be elaborated herein.

Those skilled in the art should understand that all or some of the steps in the methods according to the above embodiments may be implemented by controlling relevant hardware via programs, the programs may be stored in a computer readable storage medium, and the storage medium may be a Read-Only Memory/Random Access Memory (ROM/RAM), a magnetic disk or an optical disk.

The preferred embodiments of the disclosure are illustrated above with reference to the drawings, and the scope of the disclosure is not limited accordingly. Those skilled in the art may implement the disclosure using various equivalents without departing from the scope and nature of the disclosure. For example, the features in one embodiment may be applied to the other embodiment to obtain another embodiment. Any modification, equivalent replacements and improvements made within the technical concept of the disclosure shall fall within the scope of the disclosure.

INDUSTRIAL APPLICABILITY

In a photographing method and apparatus according to the disclosure, during light-painting photographing, some or all of synthesized images generated during photographing are cached. When a user executes a return operation, a corresponding synthesized image is extracted for displaying in real time from the cached synthesized images according to an operation instruction from the user, and serves as a basic image in next synthesis, which is equivalent to erasing or deleting a certain part of the photographed contents, thereby achieving modification for light-painted images in real time and allowing the user to complete one light-painting action with multiple pauses accordingly. Therefore, a more perfect and complex effect is achieved, the light-painting creation effect and creation efficiency are improved, and the user experience is improved.

The invention claimed is:

1. A photographing method, comprising:
continuously acquiring images during photographing, synthesizing a currently acquired image with a current basic image into a synthesized image, and taking the synthesized image as a basic image in next synthesis;
caching synthesized images during photographing; and
extracting, according to an operation instruction from a user, an synthesized image from the cached synthesized images to serve as a current basic image, so as to return a photographing progress to a photographing state displayed by the extracted synthesized image.

2. The photographing method according to claim 1, wherein caching the synthesized images during photographing comprises:
continuously caching all of the synthesized images during photographing; or,
caching a currently synthesized image at a preset time interval during photographing.

3. The photographing method according to claim 1, wherein caching the synthesized images during photographing comprises: caching, when it is detected that the brightness of the currently acquired image is smaller than a threshold during photographing, a currently synthesized image.

4. The photographing method according to claim 3, wherein the threshold is a preset proportion of maximum brightness represented by an image format.

5. The photographing method according to claim 1, wherein before extracting the synthesized image from the cached synthesized images to serve as the current basic image, the method further comprises: pausing photographing.

6. The photographing method according to claim 1, wherein before synthesizing the currently acquired image with the current basic image into the synthesized image, the method further comprises: determining an initial basic image.

7. The photographing method according to claim 6, wherein determining the initial basic image comprises: loading a picture as the initial basic image, or taking a first acquired image as the initial basic image.

8. The photographing method according to claim 1, further comprising: storing, after the photographing is ended, a currently displayed synthesized image, and deleting all of the cached synthesized images.

9. The photographing method according to claim 1, wherein the operation instruction comprises a swipe operation, executed by the user, on a screen or an operation, executed by the user, on a virtual button or a progress bar displayed on the screen.

10. A photographing apparatus, comprising an image acquisition module, an image processing module, a display module and a caching module, wherein
the image acquisition module is configured to continuously acquire images;
the image processing module is configured to: synthesize a currently acquired image with a current basic image into a synthesized image, and take the synthesized image as a basic image in next synthesis; cache synthesized images during photographing to the caching module; and extract, according to an operation instruction from a user, a synthesized image from the caching module to serve as a current basic image, so as to return a photographing progress to a photographing state displayed by the extracted synthesized image; and
the display module is configured to display the synthesized image in real time.

11. The photographing apparatus according to claim 10, wherein the image processing module is configured to:
continuously cache all of the synthesized images during photographing to the caching module; or,
cache a currently synthesized image to the caching module at a preset time interval during photographing.

12. The photographing apparatus according to claim 10, wherein the image processing module is configured to: cache, when it is detected that the brightness of the currently acquired image is smaller than a threshold during photographing, a currently synthesized image to the caching module.

13. The photographing apparatus according to claim 12, wherein the threshold is a preset proportion of maximum brightness represented by an image format.

14. The photographing apparatus according to claim 10, further comprising a control module, configured to control starting, pausing and ending of the photographing.

15. The photographing apparatus according to claim 10, wherein the image processing module is further configured to: determine an initial basic image.

16. The photographing apparatus according to claim 15, wherein the image processing module is configured to: load a picture as the initial basic image, or take a first acquired image as the initial basic image.

17. The photographing apparatus according to claim 10, further comprising a storage module, the storage module being configured to: take, when the photographing is ended, a currently displayed synthesized image as a final photographed image for storing.

18. The photographing apparatus according to claim 10, wherein the image processing module is further configured to: delete, when the photographing is ended, all of the synthesized images cached in the caching module.

19. The photographing apparatus according to claim 10, wherein the operation instruction comprises a swipe operation, executed by the user, on a screen or an operation, executed by the user, on a virtual button or a progress bar displayed on the screen.

20. A photographing method, comprising:
continuously acquiring images during photographing, synthesizing a currently acquired image with a current basic image into a synthesized image, and taking the synthesized image as a basic image in next synthesis;
caching, when it is detected that the brightness of the currently acquired image is smaller than a threshold, a currently synthesized image; and
extracting, according to an operation instruction from a user, a synthesized image from the cached synthesized images to serve as a current basic image, so as to return a photographing progress to a photographing state displayed by the extracted synthesized image.

* * * * *